US009753871B2

(12) United States Patent
Auernhammer et al.

(10) Patent No.: US 9,753,871 B2
(45) Date of Patent: *Sep. 5, 2017

(54) BRIDGE AND METHOD FOR COUPLING A REQUESTING INTERCONNECT AND A SERVING INTERCONNECT IN A COMPUTER SYSTEM (71) Applicant: International Business Machines Corporation, Armonk, NY (US)

(72) Inventors: Florian A. Auernhammer, Rueschlikon (CH); Joseph G. McDonald, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/744,376

(22) Filed: Jun. 19, 2015

(65) Prior Publication Data
US 2015/0286591 A1 Oct. 8, 2015

Related U.S. Application Data (63) Continuation of application No. 14/600,556, filed on Jan. 20, 2015.

(30) Foreign Application Priority Data

Jan. 31, 2014 (GB) .................... 1401670.3

(51) Int. Cl.
G06F 13/16 (2006.01)
G06F 13/40 (2006.01)
(52) U.S. Cl.
CPC ...... *G06F 13/1642* (2013.01); *G06F 13/1673* (2013.01); *G06F 13/4027* (2013.01); *G06F 13/4068* (2013.01)

(58) Field of Classification Search
CPC ...... G06F 13/14; G06F 13/16; G06F 13/1621; G06F 13/1626; G06F 13/1642;
(Continued)

(56) References Cited

U.S. PATENT DOCUMENTS 5,815,677 A * 9/1998 Goodrum ............ G06F 13/4059
710/22
5,835,741 A * 11/1998 Elkhoury ............ G06F 13/4059
710/310

(Continued)

OTHER PUBLICATIONS

Florian A. Auernhammer, et al.,"Bridge and Method for Coupling a Requesting Interconnect and a Serving Interconnect in a Computer System," U.S. Appl. No. 14/744,379, filed Jun. 19, 2015.

(Continued)

*Primary Examiner* — Thomas J Cleary
(74) *Attorney, Agent, or Firm* — Cantor Colburn LLP; Keivan Razavi (57) ABSTRACT A bridge for coupling a requesting interconnect and a serving interconnect connected to a number of coherent units in a computer system includes a first interface configured to receive a read request and a number of dependent write requests that the read request depends on from the requesting interconnect; and an issuer configured to issue the received number of dependent write requests to the serving interconnect and for issuing the received read request to the serving interconnect after issuing the number of dependent write requests and before receiving write acknowledgments for the issued dependent write requests from the serving interconnect.

5 Claims, 7 Drawing Sheets (58) Field of Classification Search
CPC ............. G06F 13/1673; G06F 13/4004; G06F 13/4013; G06F 13/4027; G06F 13/4036; G06F 13/4068; G06F 9/3836; G06F 9/3838; G06F 9/3842; G06F 9/3855; G06F 9/3857; G06F 9/3859; G06F 9/3861
See application file for complete search history.

(56) References Cited

U.S. PATENT DOCUMENTS

| | | | | |
|---|---|---|---|---|
| 6,301,627 | B1* | 10/2001 | Neal | G06F 13/4027 709/232 |
| 6,502,157 | B1* | 12/2002 | Batchelor | G06F 13/4059 710/305 |
| 7,600,078 | B1* | 10/2009 | Cen | G06F 12/0831 711/137 |
| 7,996,625 | B2* | 8/2011 | Khare | G06F 12/0817 711/100 |
| 2007/0067549 | A1* | 3/2007 | Gehman | H04L 12/4625 710/315 |
| 2011/0055439 | A1* | 3/2011 | Chen | G06F 13/4027 710/57 |
| 2015/0220461 | A1 | 8/2015 | Auernhammer et al. | |
| 2015/0220469 | A1* | 8/2015 | Auernhammer | G06F 13/376 710/123 |
| 2015/0286591 | A1* | 10/2015 | Auernhammer | G06F 13/1642 710/310 |
| 2015/0286592 | A1* | 10/2015 | Auernhammer | G06F 13/376 710/310 |
| 2016/0139829 | A1* | 5/2016 | Sanzone | G06F 12/0811 711/122 |

OTHER PUBLICATIONS

List of IBM Patents or Patent Applications Treated as Related; Date Filed: Jun. 19, 2015, pp. 1-2.

* cited by examiner

BRIDGE AND METHOD FOR COUPLING A REQUESTING INTERCONNECT AND A SERVING INTERCONNECT IN A COMPUTER SYSTEM

DOMESTIC AND FOREIGN PRIORITY

This application is a continuation of U.S. patent application Ser. No. 14/600,556, filed Jan. 20, 2015, which claims priority to Great Britain Patent Application No. 1401670.3, filed Jan. 31, 2014, and all the benefits accruing therefrom under 35 U.S.C. §119, the contents of which in its entirety are herein incorporated by reference.

BACKGROUND

The invention relates to a bridge for coupling a requesting interconnect and a serving interconnect connected to a number of processing units in a computer system. Moreover, the present invention relates to a method and to a computer program for coupling a requesting interconnect and a serving interconnect connected to a number of processing units in a computer system.

The present bridge is configured to provide a load/store path for inbound requests between interconnects with ordering requirements. For example, the bridge may be arranged between an I/O bus, like PCI Express, as a requesting interconnect on a requesting side (also called south) and a serving interconnect, e.g., a snooping-based coherent interconnect, on a serving side (also called north).

I/O devices or I/O buses, like PCI Express, are based on strong ordering requirements, defining that in particular read requests may not pass write requests that were issued ahead of the read request. As a result, the read request is guaranteed to not receive stale information in case it would access the same data that is modified by a previous write request.

Figure 1:
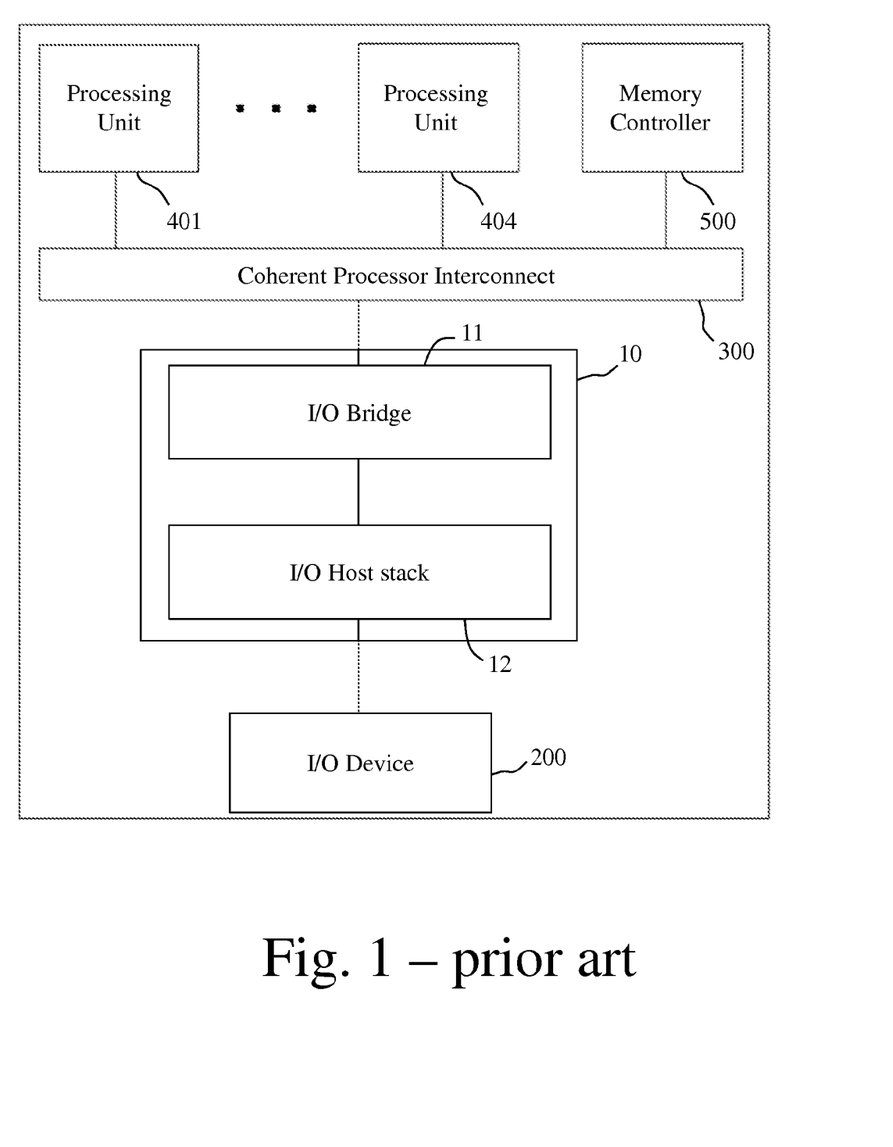
FIG. 1 shows a schematic block diagram of a conventional bridge coupling an I/O device and a processor interconnect.

In this regard, FIG. 1 shows a schematic block diagram of an example of a bridge 10 coupling an I/O device 200 and a coherent processor interconnect 300. The coherent processor interconnect 300 couples a plurality of processing units 401 to 404 and a memory controller 500, for instance.

The coherent processor interconnect 300 may be a snooping-based coherent interconnect which may include the possibility for a request (command) to be retried. The necessity of a retry may be caused by missing resources in the coherent units 401-404, 500 attached to the coherent processor interconnect 300 and potentially responsible to handle the request, e.g., when all the request queues of the memory controller 500 are already taken by other requests, or by address conflicts when a request for the address is currently already being processed in the coherent processor interconnect 300 and the address is protected against other operations of the coherent units 401-404, 500, 100 involved in the transfer.

Depending on the implementation of the logic of the bridge 10 attached to the I/O device 200—which may also be called south interface—also the responses returned for load requests from the south interface 200 may require retries when the logic of the bridge runs out of buffer space, e.g., because of delayed credit returns between the I/O bridge 11 and the I/O host stack 12.

Moreover, a bridge as shown in FIG. 1 for handling loads or writes from the I/O device 200 may have to support strong ordering requirements of write requests and also read requests. The read and write requests (load and store requests) are received by the bridge at its south interface.

U.S. Pat. No. 7,996,625 B2 describes a method for reducing memory latency in a multi-node architecture. A speculative read request is issued to a home node before results of a cache coherence protocol are determined. The home node initiates a read to memory to complete the speculative read request. Results of a cache coherence protocol may be determined by a coherence agent to resolve cache coherency after the speculative read request is issued.

U.S. Pat. No. 7,600,078 B1 describes a method for speculatively performing read transactions. The method includes speculatively providing a read request to a memory controller associated with a processor, determining coherency of the read request in parallel with obtaining data of the speculatively provided read request, and providing the data of the speculatively provided read request to the processor if the read request is coherent. In this way, data may be used by a processor with a reduced latency.

SUMMARY

In one embodiment, a bridge for coupling a requesting interconnect and a serving interconnect connected to a number of coherent units in a computer system includes a first interface configured to receive a read request and a number of dependent write requests that the read request depends on from the requesting interconnect; and an issuer configured to issue the received number of dependent write requests to the serving interconnect and for issuing the received read request to the serving interconnect after issuing the number of dependent write requests and before receiving write acknowledgments for the issued dependent write requests from the serving interconnect.

In another embodiment, a method for coupling a requesting interconnect and a serving interconnect connected to a number of coherent units in a computer system includes receiving a read request and a number of dependent write requests that the read request depends on from the requesting interconnect; issuing the received number of dependent write requests to the serving interconnect; and issuing the received read request to the serving interconnect after issuing the number of dependent write requests and before receiving write acknowledgments for the issued dependent write requests from the serving interconnect.

BRIEF DESCRIPTION OF THE DRAWINGS

Similar or functionally similar elements in the figures have been allocated the same reference signs if not otherwise indicated.

DETAILED DESCRIPTION

In view of the above, it is an aspect of the present invention to improve bridging a requesting interconnect, like an I/O device, and a serving interconnect, like a processor interconnect.

According to a first aspect, a bridge for coupling a requesting interconnect and a serving interconnect connected to a number of processing units in a computer system is suggested. The bridge includes a first interface and an issuer. The first interface is configured to receive a read request and a number of dependent write requests that the read request depends on from the requesting interconnect. The issuer is configured to issue the received number of dependent write requests to the serving interconnect. Moreover, the issuer is configured to issue the received read request to the serving interconnect after issuing the number of dependent write requests and before receiving write acknowledgments for the issued dependent write requests from the serving interconnect.

By issuing the read request being dependent on the write request(s) as early as possible, the present bridge improves the performance, especially for the cases were requests are issued at the full system scope as well as reducing latency for read requests in normal cases.

For this reason, the present issuing proposed by the bridge may be called speculative read, eager read mode or early read mode. According to some implementations, the requesting interconnect may be an I/O device or I/O bus. Further, the serving interconnect may be a processor interconnect, in particular a coherent processor interconnect, e.g., a snooping based coherent interconnect. Furthermore, according to some implementations, the issuer may be embodied as or may comprise a controller, for example a microcontroller. The issuer is configured to implement ordering requirements of write requests and read requests, in particular strong ordering requirements, e.g., Rd-after-Wr ordering and Wr ordering.

For example, a read acknowledgment is an acknowledgment of the serving interconnect for an issued read request. It may be also called a positive response or a clean combined response. In an analogous way, a write acknowledgment may be an acknowledgment of the serving interconnect for an issued write request.

In an embodiment, the bridge includes a plurality of read machines for handling read requests received at the first interface, and for handling read responses received from the north interconnect. In a further embodiment, the bridge includes a plurality of write machines for handling write requests received at the first interface, and for handling write responses received from the north interconnect.

For example, a read machine is coupled to the issuer and therefore controlled by the issuer. The read machine itself controls an allocated read data buffer coupled between the read buffers of the first interconnect (south interconnect) and the second interconnect (north interconnect) of the bridge. Also, the respective write machine may be controlled by the issuer. Thus, the issuer may implement a write ordering scheme. The respective write machine controls a write data buffer coupled between the write data buffers of the south interface and the north interface.

In a further embodiment, the issuer is configured to control the plurality of read machines and the plurality of write machines. For example, the issuer is the central control entity of the bridge. In a further embodiment, the first interface is configured to connect the bridge with the requesting interconnect.

In a further embodiment, the first interface includes a first buffer for buffering write data received from the requesting interconnect, a second buffer for buffering read requests and write requests received from the requesting interconnect and being coupled to the issuer, a third buffer for buffering read responses and a fourth buffer for buffering read data received from the serving interconnect. In a further embodiment, the bridge includes a second interface which is configured to connect the bridge with the serving interconnect.

In a further embodiment, the second interface includes a first buffer for buffering write data for the serving interconnect, a second buffer for buffering read requests and write requests issued for the serving interconnect, a third buffer for buffering read responses and write responses received from the serving interconnect and a fourth buffer for buffering read data received from the serving interconnect.

In a further embodiment, the issuer is configured to re-issue the issued read request, if a read acknowledgment for the issued read request is not received from the serving interconnect. For example, the issuer may re-issue the issued read request immediately, if the respective read acknowledgment is not received. Therefore, the present issuer may provide an eager retry or eager retrying mode.

In a further embodiment, for each of the read machines, the bridge includes a read data buffer coupled between the fourth buffer of the first interface and the fourth buffer of the second interface, wherein the read data buffer is configured to provide read data received from the serving interconnect in response to the issued read request to the requesting interconnect, if a read acknowledgment for the issued read request and all write acknowledgments for the issued dependent write requests are received from the serving interconnect.

In a further embodiment, the issuer is configured to re-issue the issued read request, if not all write acknowledgments for the issued dependent write requests are received from the serving interconnect. In a further embodiment, the issuer is configured to re-issue the issued read request immediately or after all write acknowledgments for the issued dependent write requests are received from the serving interconnect. To decide on re-issuing the issued read request, the issuer may use a certain decision.

In this example, the issuer may select to use an eager retrying scheme or a conservative retrying scheme, in particular in dependence on load and/or conflict issues. In a further embodiment, the bridge includes a decider for making the certain decision in dependence on an actual load at the serving interconnect and/or on an occurrence of a conflict between the issued read request and one of the issued dependent write requests.

The respective entity, e.g., the issuer or the decider, may be implemented in hardware and/or in software. If the entity is implemented in hardware, it may be embodied as a device, e.g., as a computer or as a processor or as a part of a system, e.g., a computer system. If the entity is implemented in software it may be embodied as a computer program product, as a function, as a routine, as a program code or as an executable object.

Any embodiment of the first aspect may be combined with any embodiment of the first aspect to obtain another embodiment of the first aspect.

According to a second aspect, a system is suggested which includes a requesting interconnect, like an I/O device, a serving interconnect, like a processor interconnect, and a bridge of the above-mentioned first aspect for coupling the requesting interconnect and the serving interconnect.

According to a third aspect, a method for coupling a requesting interconnect and a serving interconnect connected to a number of processing units in a computer system is suggested.

The method includes the following operations:

In a first step, a read request and a number of dependent write requests that the read request depends on are received from the requesting interconnect. In a second step, the received number of dependent write requests is issued to the serving interconnect. In a third step, the received read request is issued to the serving interconnect after issuing the number of dependent write requests and before receiving write acknowledgments for the issued dependent write requests from the serving interconnect. The first step, the second step and the third step are executed consecutively.

According to a fourth aspect, the invention relates to a computer program comprising a program code for executing the method of the third aspect for coupling a requesting interconnect and a serving interconnect when run on at least one computer.

In the following, exemplary embodiments of the present invention are described with reference to the enclosed figures.

Figure 2:
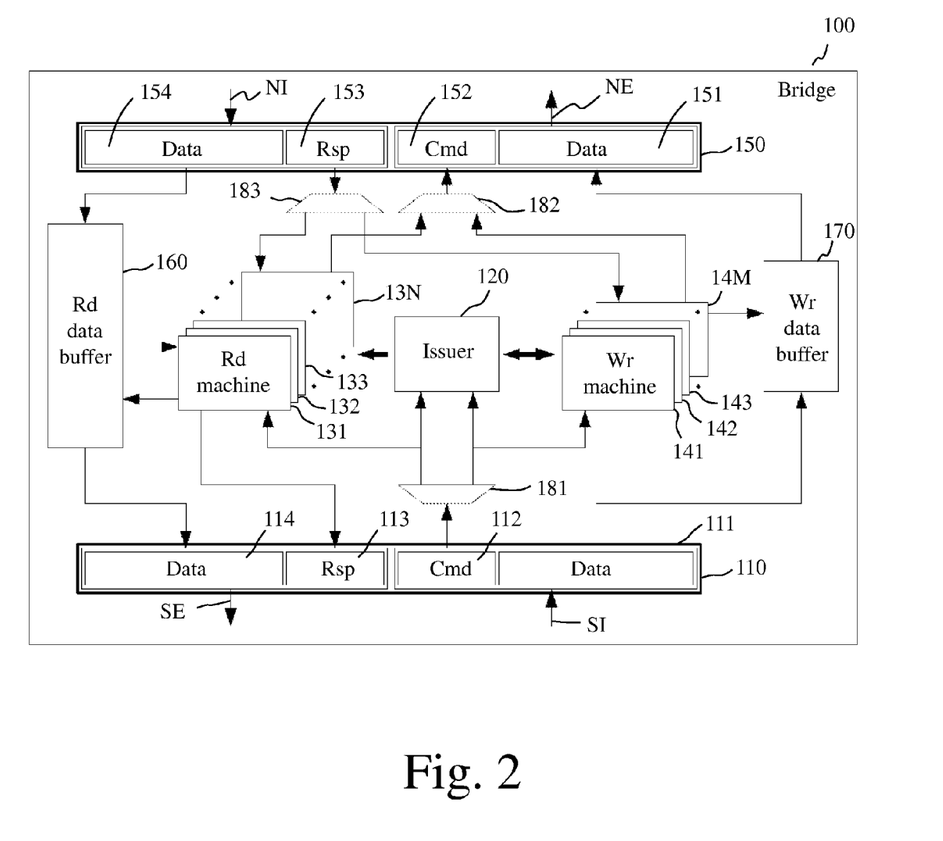
FIG. 2 shows a schematic block diagram of an embodiment of a bridge for coupling a requesting interconnect and a serving interconnect.

Referring now to FIG. 2, a schematic block diagram of an embodiment of a bridge 100 for coupling a requesting interconnect 200 and a serving interconnect 300 is depicted.

For example, the requesting interconnect 200 may be an I/O device and the serving interconnect 300 may be a coherent processor interconnect 300 as exemplarily shown in FIG. 1. The coherently coupled units 401-404, 500 may include a number of processing units 401-404 and a number of memory controllers 500 (see FIG. 1).

The bridge 100 of FIG. 2 includes a first interface 110 which is configured to connect the bridge 100 with the requesting interconnect 200, an issuer 120, a number of read (Rd) machines 131-13N, a number of write (Wr) machines 141-14M, a second interface 150 which is configured to connect the bridge 100 with the serving interconnect 300, a read (Rd) data buffer 160 for each of the Rd machines 131-13N and a write (Wr) data buffer 170 for each of the Wr machines 141-14M.

Regarding the Rd machines 131-13N, N is an integer greater than or equal to 1 (N≥1). Regarding the Wr machines 141-14M, M is an integer greater than or equal to 1 (M≥1). Further, in FIG. 1, data refers to write data transferred from the requesting interconnect 200 to the serving interconnect 300 or to read data transferred from the serving interconnect 300 to the requesting interconnect 200. Further, Rsp refers to responses like write acknowledgments or read acknowledgments, Cmd refers to commands like read (Rd) requests or write (Wr) requests. Rd refers to read and Wr refers to write. Furthermore, SI refers to south ingress, i.e., an input coupled to the requesting interface 200. Further, SE refers to south egress, i.e., an output coupled to the requesting interface 200. In an analogous way, NE refers to north egress, i.e., an output coupled to the serving interface 300. Moreover, NI refers to the north ingress, an input coupled to the serving interface 300.

The first interface 110 includes a first buffer 111 for buffering write data received from the requesting interconnect 200, a second buffer 112 for buffering read requests and write requests received from the requesting interconnect 200, a third buffer 113 for buffering read responses like response commands and a fourth buffer 114 for buffering read data received from the serving interconnect 300.

Furthermore, the second interface 150 includes a first buffer 151 for buffering write data for the serving interconnect 300, a second buffer 152 for buffering read requests and write requests issued for the serving interconnect 300, a third buffer 153 for buffering read responses and write responses received from the serving interconnect 300 and a fourth buffer 154 for buffering read data received from the serving interconnect 300. The issuer 120 is coupled to the second buffer 112 of the first interface 110 by a multiplexer 181 separating read requests for the read machines 131-13N and write requests for the write machines 141-14M.

Further, the multiplexer 182 couples the read machines 131-13N and the write machines 141-14M with the second buffer 152 of the second interface 150 for issuing the write and read requests to the serving interface 120. Moreover, the multiplexer 183 couples the third buffer 153 of the second interface 150 with the read machines 131-13N and write machines 141-14M for transferring read acknowledgments and write acknowledgments received from the serving interconnect 300.

In general, the first interface 110 is configured to receive a read request and a number of write requests that the read request depends on from the requesting interconnect 200 via the first interface 110. The issuer 120 is configured to issue the received number of dependent write requests to the serving interconnect 300 via the second interface 150. Further, the issuer 120 is configured to issue the received read request to the serving interconnect 300 via the second interface 150 after having issued the number of dependent write requests and before receiving write acknowledgments for the issued dependent write requests from the serving interconnect 300. Because the issuer 120 issues the read requests before receiving write acknowledgments of the dependent write requests, the present scheme may also be called speculative read scheme, speculative read or speculative read issuing.

If a read acknowledgment allocated to the issued read request is not received from the serving interconnect 300, the issuer 120 may be configured to re-issue the issued read request. Moreover, the read data buffer 160 may be configured to provide read data received from the serving interconnect 300 in response to the issued read request to the requesting interconnect 200 if a read acknowledgment allocated to the issued read request and all write acknowledgments allocated to the issued dependent write requests are received from the serving interconnect 300. Further, the issuer 120 may re-issue the issued read request, if not all the write acknowledgments for the issued dependent write requests are received from the serving interconnect 300.

Based on a certain decision, the issuer 120 may re-issue the issued read request immediately or alternatively after all write acknowledgments allocated to the issued dependent write requests are received from the serving interconnect 300. In this regard, the issuer 120 may comprise a decider which is configured to make the certain decision in dependence on an actual load at the serving interconnect 300 and/or on an occurrence of a conflict between the issued read request and one of the issued dependent write requests.

In sum, the present issuer 120 controls the issuing of the read requests and the dependent write requests based on strong ordering requirements. As mentioned above, a main ordering requirement is that a read request is only issued after write requests being dependent on the read request are issued. A further ordering requirement may be implemented by the present issuer 120 regarding issuing certain write requests before other write requests. All these ordering requirements may be implemented in the issuer 120 so that the issuer 120 may control the read machines 131-13N and the write machines 141-14M accordingly.

Figure 3:
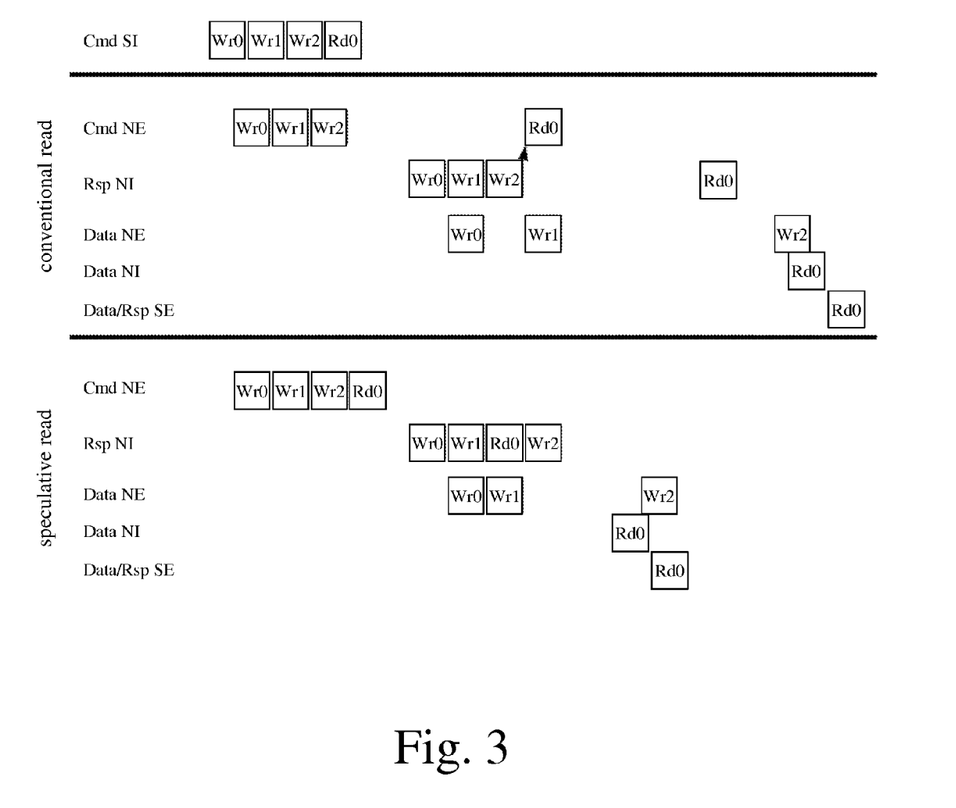
FIG. 3 shows a schematic diagram illustrating a conventional read scheme versus the present speculative read scheme.

FIG. 3 shows a schematic diagram illustrating a conventional read scheme versus the present speculative read scheme. The present speculative read scheme may also be called eager read scheme or early read scheme. The first line of FIG. 3 shows the commands Cmd as received at south ingress SI of FIG. 2.

To maintain strong ordering requirements as discussed above, in the conventional read scheme, a read request Rd0 is only issued when an acknowledgment or a clean combined response has been received from the serving interconnect 300 for all depending write operations Wr0, Wr1 and Wr2. This may guarantee that the write is visible to all processing units 401-404 attached to the coherent interconnect 300, and therefore new requests issued after this point will be retried, while write data is being transferred to the target destination, or they will receive the updated data.

For the read request Rd0 in the conventional read scheme, this implies that the read request Rd0 can only be started after the combined response for all depending write commands Wr0, Wr1, Wr2 issued on north egress NE are received as shown in the line Rsp NI (responses north ingress) and received an acknowledgment (clean combined response). This is shown by the arrow in the conventional read scheme of FIG. 3. This means that it takes at least a round trip time typical for the serving interconnect for issuing a command, like a write request, and receiving a response for it. The read request itself Rd0 then requires the same time for receiving its respective acknowledgment (combined response). In most cases, only this combined response for a read request then triggers the data transfer of the read data to the bridge, arriving on north ingress NI which can then be forwarded by the bridge as response to the read request Rd0 to the south egress SE port (Data/Rsp SE).

In contrast, the last five lines of FIG. 3 show the present speculative read scheme where the read request Rd0 is issued immediately after all depending write Wr0, Wr1, Wr2 are issued. Here, it is not necessary to wait for the acknowledgments of Wr0, Wr1, Wr2. This allows saving a full request-response round trip time on the coherent serving interconnect. Thus, both a significant reduction in read response latency and read machine use time is provided. The reduction in read machine use time thus increases the maximum bandwidth achievable with a predefined number of read machines at the same command issue-to-response latency on the coherent serving interconnect.

Figure 4:
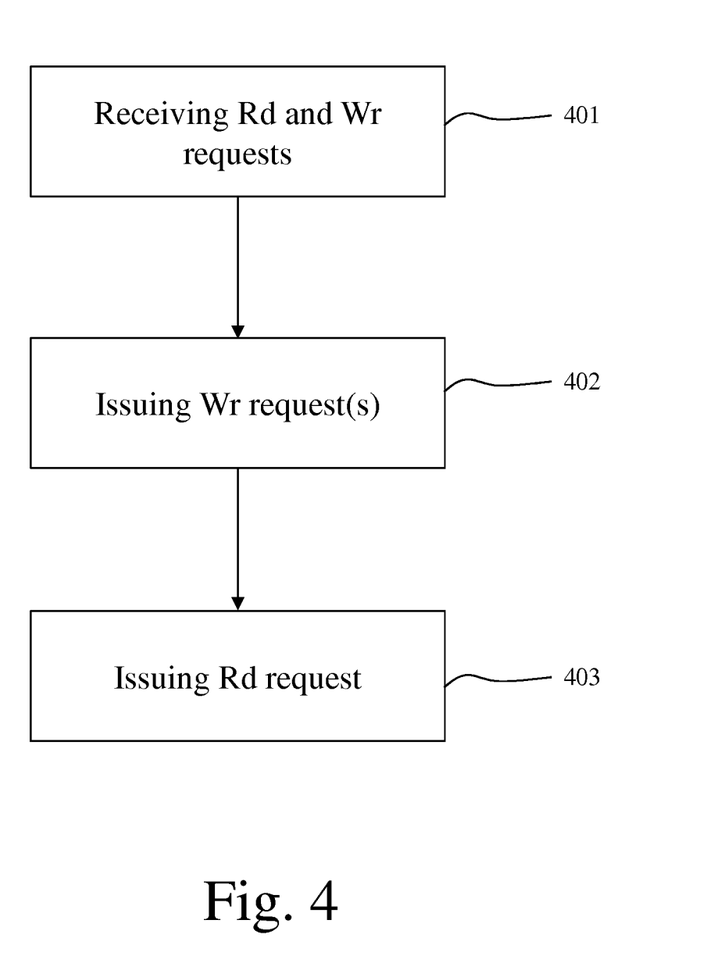
FIG. 4 shows a first embodiment of a sequence of method steps for coupling a requesting interconnect and a serving interconnect.

FIG. 4 depicts a first embodiment of a sequence of method steps for coupling a requesting interconnect 200 and a serving interconnect 300 by a bridge 100. The method of FIG. 4 includes the following blocks 401-403. In block 401, a read request and a number of write requests that the read request depends on are received from the requesting interconnect 200 at the bridge 100. In block 402, the received number of dependent write requests is issued by the bridge 100 to the serving interconnect 200. In block 403, the received read request is issued by the bridge 100 to the serving interconnect 200 after having issued the number of dependent write requests and before receiving write acknowledgments for the issued dependent write requests from the serving interconnect 300.

Figure 5:
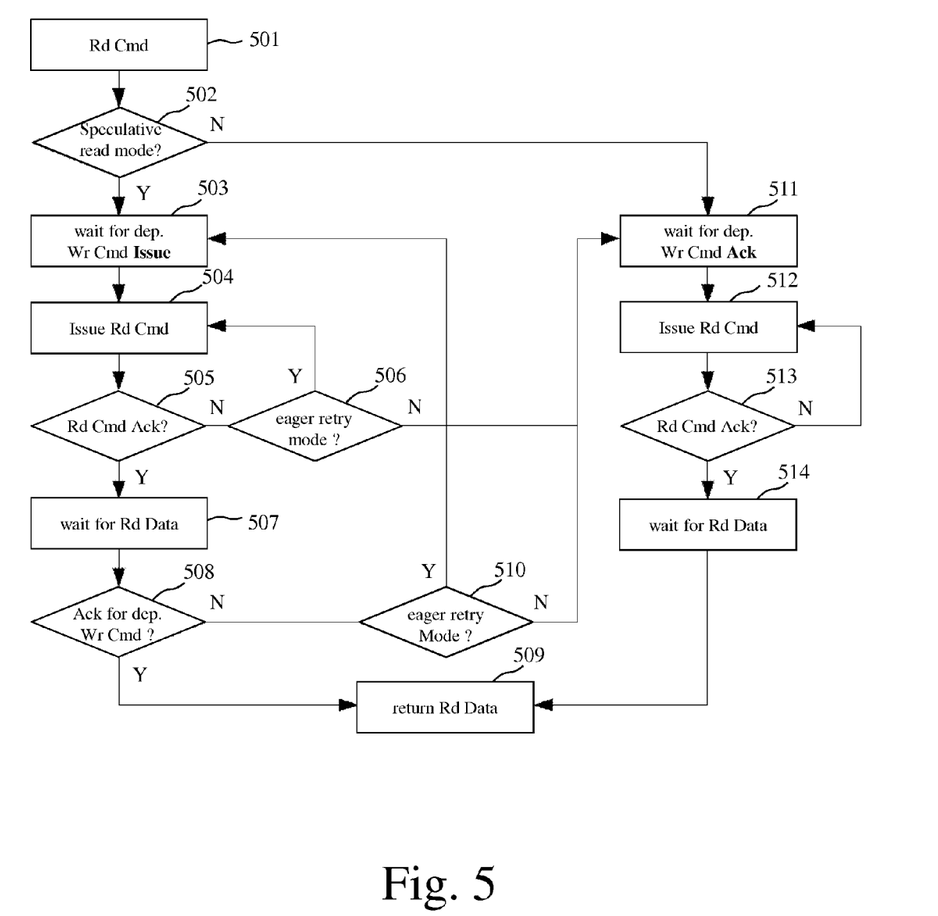
FIG. 5 shows a second embodiment of a sequence of method steps for coupling a requesting interconnect and a serving interconnect.

FIG. 5 shows a second embodiment of a sequence of method steps for coupling a requesting interconnect and a serving interconnect. In block 501 of FIG. 5, the bridge receives a read command Rd Cmd (read request). In block 502, it is decided if the speculative read mode is used or not. For the positive case (Y=Yes), the method proceeds with block 503. In block 503, it is checked if all write commands that the received read command is dependent on are issued. In block 504, the read command Rd Cmd is issued. In block 505, it is checked if the acknowledgment Rd Cmd Ack is received for the issued read command. If negative (N=No), it is checked if the eager retry mode is used and the method proceeds with block 504 or the conventional retry mode is used and the method proceeds with block 511. In the positive case of block 506, the method proceeds with block 507. In block 507, it is waited for the read data.

In block 508, it is checked if the acknowledgments for the dependent write commands are received. For the positive case (Y=Yes), the method proceeds with block 509 and the read data is returned to the requesting interconnect. In the negative case of block 508 (N=No), the method proceeds with block 510. Block 510 corresponds to that of 506. In block 511, the method waits for the dependent write command acknowledgments Wr Cmd Ack. After that, the method proceeds with block 512. In block 512, the read command Rd Cmd is issued. After that, it is waited for the corresponding read command acknowledgment in block 513. For the negative case in block 513, the method returns to block 512. In the positive case of block 513, the method proceeds with block 514, where it is waited for the read data. If the read data is received, it may be returned in block 509.

Recapitulating the request flow of FIG. 5, the corresponding read machine only waits until all depending writes have issued their commands. The read is then issued early and waits for the response from the coherent serving interconnect. In case of a retry, the command can be issued immediately, or it can fall back into the conservative mode (see right part of FIG. 5) and wait for a clean response for all depending writes before re-issuing the command. If the command is acknowledged, the read machine waits for the read data to arrive. It then checks if all its depending write commands have been completely successful. If this is the case, it can return the data on the south egress port as shown in block 509. Otherwise, it determines which retry mode is configured (see block 506). In an eager retry mode, it issues the read command early after all depending writes that had to be retried have issued their commands on the coherent serving interconnect. It can, however, also fall back into the conservative mode and wait for the clean combined response (acknowledgment) for all depending retried write commands before re-issuing the read commands (see block 510).

In any case, before determining which retry mode may be used, the read machine first needs to complete the initial read request, independent of the response that its depending writes received. This means that the early read has to be executed to completion before it can be retried. Otherwise, there may be conflicts in the coherent interconnect when the data response for the previous read is still in flight while the exact same read request is re-executed from the same read machine.

Figure 6:
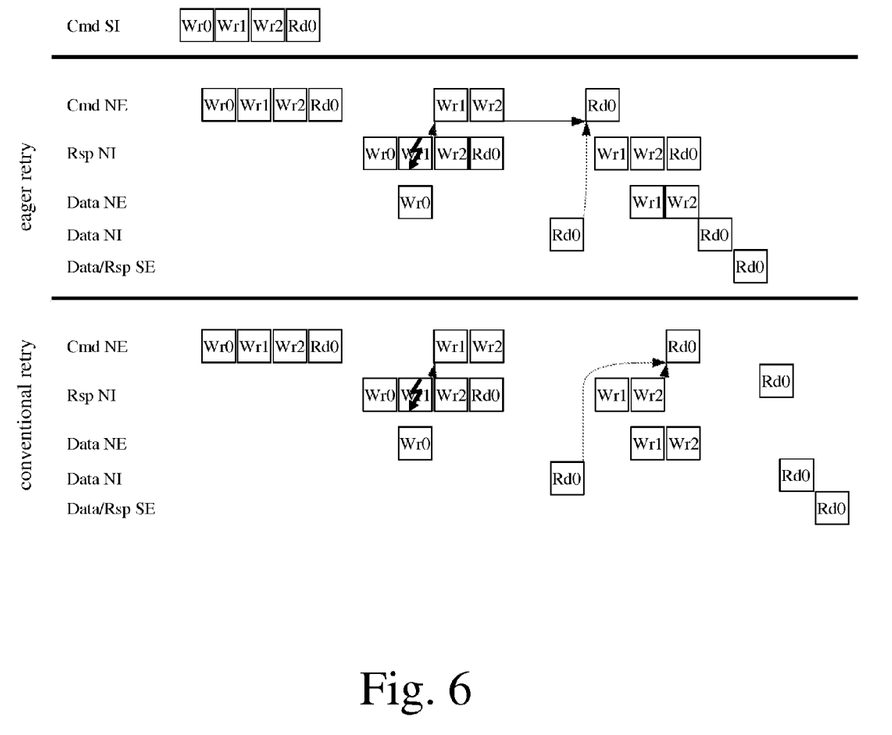
FIG. 6 shows a schematic diagram illustrating a conventional retry scheme versus the present eager retry scheme.

This and the two different retry modes are exemplarily shown in FIG. 6. In the eager retry mode, Wr1 receives a non-acknowledgment response and has to be retried, together with Wr2 (because of write ordering) and Rd0 (because of read-after-write ordering). This is shown in the section of the eager retry mode in FIG. 6 by a flash over the Wr1 in the line Rsp NI.

Although in this case, the read machines are configured to eagerly retry reads, the read machine needs to first wait for the data response for the initial read on the north ingress NI interface before it can re-issue the read on the north egress NE interface. However, it may issue the read before waiting for the combined response (acknowledgment) on the north inbound (NI interface) for the depending writes Wr1 and Wr2.

In contrast, in the conventional retry scheme, Wr1 gets retried so that Wr1, Wr2 and Rd0 have to be re-issued. For re-issuing Rd0, there are two conditions, namely the reception of the data of Rd0 at Data NI and the acknowledgments of Wr1 and Wr2 at Rsp NI. Comparing the conventional retry and the eager retry, one can see that the re-issue of Rd0 is much earlier in the eager retry.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 4 or 5 may be implemented in software, as an executable program, the latter executed by suitable digital processing devices. More generally, embodiments of the present invention may be implemented wherein general-purpose digital computers, such as personal computers, workstations, etc., are used.

Figure 7:
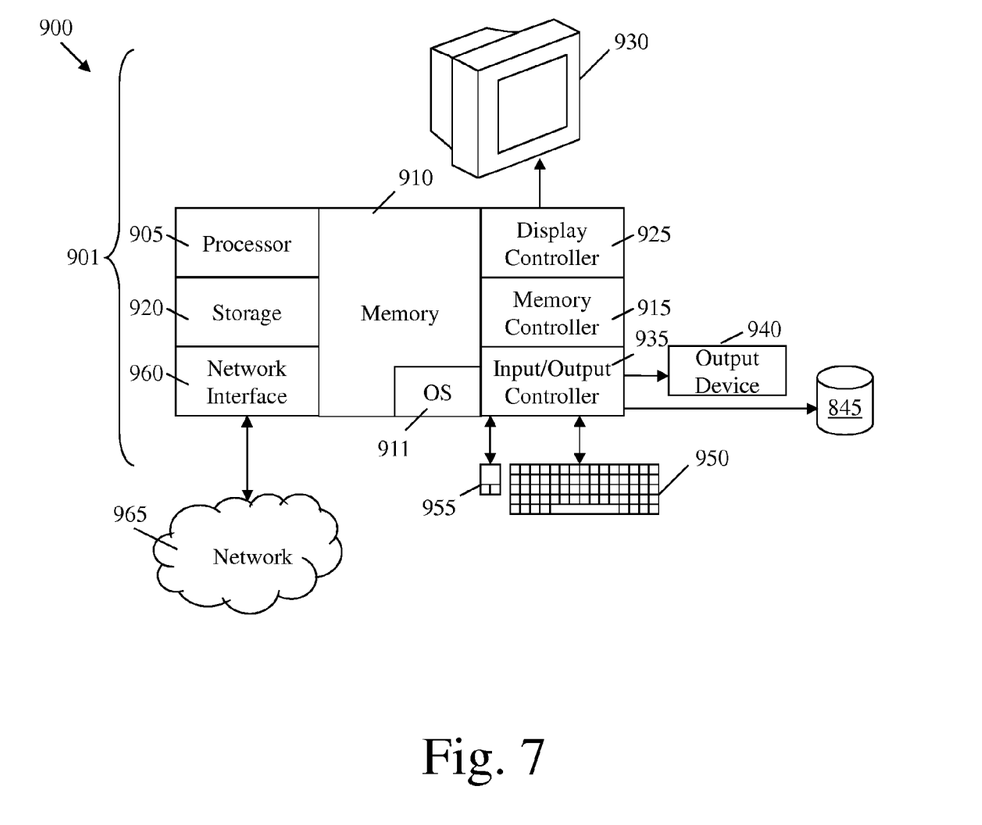
FIG. 7 shows a schematic block diagram of an embodiment of a system adapted for coupling a requesting interconnect and a serving interconnect.

For instance, the system 900 depicted in FIG. 7 schematically represents a computerized unit 901, e.g., a general-purpose computer. In exemplary embodiments, in terms of hardware architecture, as shown in FIG. 7, the unit 901 includes a processor 905, memory 910 coupled to a memory controller 915, and one or more input and/or output (I/O) devices 940, 945, 950, 955 (or peripherals) that are communicatively coupled via a local input/output controller 935. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 7, the software in the memory 910 includes methods described herein in accordance with exemplary embodiments and a suitable operating system (OS) 911. The OS 911 essentially controls the execution of other computer programs, such as the methods as described herein (e.g., FIG. 4 or FIG. 5), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 4 or 5) are implemented in software, the methods may be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. Incidentally, the terminology "first interface" as used in the above description does not necessarily imply the presence of additional interfaces, even though an additional interface (e.g., a "second interface") may be present.

REFERENCE NUMERALS

10 bridge
11 I/O bridge
12 I/O host stack
100 bridge
110 interface
111 first buffer
112 second buffer
113 third buffer
114 fourth buffer
120 issuer
131-13N read machine 141-14M write machine
150 second interface
151 first buffer
152 second buffer
153 third buffer
154 fourth buffer
160 read data buffer
170 write data buffer
200 requesting interconnect
300 serving interconnect
401-404 processing unit
500 microcontroller

The invention claimed is:

1. A method for coupling a requesting interconnect and a serving interconnect connected to a number of coherent units in a computer system, the method comprising:
receiving a read request and a number of dependent write requests that the read request depends on from the requesting interconnect;
issuing the received number of dependent write requests to the serving interconnect;
issuing the received read request to the serving interconnect after issuing the number of dependent write requests and before receiving write acknowledgments for the issued dependent write requests from the serving interconnect; and
buffering write data received from the requesting interconnect in a first buffer, buffering read requests and write requests received from the requesting interconnect in a second buffer, buffering read responses in a third buffer, and buffering read data received from the serving interconnect in a fourth buffer.

2. The method of claim 1, further comprising re-issuing the issued read request, if a read acknowledgment for the issued read request is not received from the serving interconnect.

3. The method of claim 2, wherein the received read request is re-issued based on a certain decision immediately or after all write acknowledgments allocated to the issued dependent write requests are received from the serving interconnect.

4. The method of claim 1, wherein read data received from the serving interconnect in response to the issued read request is transferred to the requesting interconnect, if a read acknowledgment for the issued read request and all write acknowledgments for the issued dependent write requests are received from the serving interconnect.

5. The method of claim 1, further comprising re-issuing the issued read request, if not all write acknowledgments for the issued dependent write requests are received from the serving interconnect.

* * * * *